US00RE42547E

(19) United States
(12) Reissued Patent
Ishikawa et al.

(10) Patent Number: US RE42,547 E
(45) Date of Reissued Patent: Jul. 12, 2011

(54) NAVIGATION APPARATUS, NAVIGATION METHOD, AND NAVIGATION PROGRAM

(75) Inventors: Hiroki Ishikawa, Anjo (JP); Tomoyuki Zaitsu, Okazaki (JP)

(73) Assignee: Aisin AW Co., Ltd., Anjo (JP)

(21) Appl. No.: 12/656,944

(22) Filed: Feb. 19, 2010

Related U.S. Patent Documents

Reissue of:
(64) Patent No.: 7,634,355
Issued: Dec. 15, 2009
Appl. No.: 12/003,019
Filed: Dec. 19, 2007

U.S. Applications:
(62) Division of application No. 11/104,575, filed on Apr. 13, 2005, now Pat. No. 7,328,101.

(30) Foreign Application Priority Data

Apr. 22, 2004 (JP) ..... 2004-126955
Apr. 22, 2004 (JP) ..... 2004-126962

(51) Int. Cl.
*G08G 1/00* (2006.01)
(52) U.S. Cl. ..... 701/209; 340/988
(58) Field of Classification Search ..... 701/207–209, 701/211, 213; 340/988–990, 994, 906
See application file for complete search history.

(56) References Cited

U.S. PATENT DOCUMENTS 5,173,691 A 12/1992 Sumner
5,862,244 A 1/1999 Kleiner et al.
5,933,100 A 8/1999 Golding
6,351,707 B1 2/2002 Ichikawa
6,542,808 B2 4/2003 Mintz
6,591,189 B2 7/2003 Shimada
6,879,907 B2 4/2005 Feldman et al.
7,096,115 B1 8/2006 Groth et al.
2002/0026278 A1 2/2002 Feldman et al.
2002/0152025 A1 10/2002 Shimada
2004/0167710 A1 8/2004 Fushiki et al.
2004/0225437 A1 11/2004 Endo et al.
2005/0216147 A1 9/2005 Ferman
2005/0222755 A1 10/2005 Tengler et al.

FOREIGN PATENT DOCUMENTS

JP A-06-251289 9/1994

(Continued)

OTHER PUBLICATIONS

Nov. 10, 2009 Office Action for Japanese Patent Application No. 2004-126955 (with English translation).

(Continued)

*Primary Examiner* — Delena Tran
(74) *Attorney, Agent, or Firm* — Oliff & Berridge, PLC

(57) ABSTRACT

Navigation apparatus, methods, and programs merge and correct a plurality of types of past traffic information. The apparatus, methods, and programs may store a plurality of types of past traffic information, each type of past traffic information having a priority and may merge the stored past traffic information in accordance the priorities. The apparatus, methods, and programs may detect adjacency relationships among the plurality of links; and, if a detected link number indicates that the corresponding link is not adjacent to adjacent links, replaces the detected link number for the link, the replaced link number indicating that the link is adjacent to the adjacent links.

6 Claims, 10 Drawing Sheets

AFTER CORRECTION

| TRAVEL TIME | LINK NUMBER |
|---|---|
| 10:00:00 | 1 |
| 10:00:01 | 1 |
| 10:00:02 | 1 |
| 10:00:03 | 1 |
| 10:00:04 | 2 |
| 10:00:05 | 2 |
| 10:00:06 | 2 |

FOREIGN PATENT DOCUMENTS

| | | |
|---|---|---|
| JP | A-9-5099 | 1/1997 |
| JP | A-9-005099 | 1/1997 |
| JP | A-09-128684 | 5/1997 |
| JP | A-10-239080 | 9/1998 |
| JP | A-2000-149180 | 5/2000 |
| JP | A-2001-067592 | 3/2001 |
| JP | A-2002-148067 | 5/2002 |
| JP | A-2002-310699 | 10/2002 |
| JP | A-2002-350162 | 12/2002 |
| JP | A-2003-194557 | 7/2003 |
| JP | A-2003-294469 | 10/2003 |
| JP | A-H09-128684 | 10/2003 |
| JP | A-2004-029871 | 1/2004 |

OTHER PUBLICATIONS

Japanese Patent Office, Notification of Reason for Rejection mailed May 18, 2010 in Japanese Patent Application No. 2004-126955 w/Partial Translation (English-language).

Japanese Patent Office, Final Notification of Reason for Rejection mailed Nov. 2, 2010 in Japanese Patent Application No. 2004-126955 w/Partial English-language Translation.

FIG. 9(a)

BEFORE CORRECTION

| TRAVEL TIME | LINK NUMBER |
|---|---|
| 10:00:00 | 1 |
| 10:00:01 | 1 |
| 10:00:02 | 98 |
| 10:00:03 | 98 |
| 10:00:04 | 98 |
| 10:00:05 | 2 |
| 10:00:06 | 2 |

FIG. 9(b)

AFTER CORRECTION

| TRAVEL TIME | LINK NUMBER |
|---|---|
| 10:00:00 | 1 |
| 10:00:01 | 1 |
| 10:00:02 | 1 |
| 10:00:03 | 1 |
| 10:00:04 | 2 |
| 10:00:05 | 2 |
| 10:00:06 | 2 |

FIG. 10(a)

BEFORE CORRECTION

| TRAVEL TIME | LINK NUMBER |
|---|---|
| 10:00:00 | 1 |
| 10:00:01 | 1 |
| 10:00:02 | 1 |
| 10:00:03 | 3 |
| 10:00:04 | 3 |
| 10:00:05 | 4 |
| 10:00:06 | 4 |

FIG. 10(b)

AFTER CORRECTION

| TRAVEL TIME | LINK NUMBER |
|---|---|
| 10:00:00 | 1 |
| 10:00:01 | 1 |
| 10:00:02 | 2 |
| 10:00:03 | 3 |
| 10:00:04 | 3 |
| 10:00:05 | 4 |
| 10:00:06 | 4 |

FIG. 11(a)

BEFORE CORRECTION

| TRAVEL TIME | LINK NUMBER |
|---|---|
| 10:00:00 | 1 |
| 10:00:01 | 1 |
| 10:00:02 | 2 |
| 10:00:03 | 3 |
| 10:00:04 | 5 |
| 10:00:05 | 5 |
| 10:00:06 | 6 |

FIG. 11(b)

AFTER CORRECTION

| TRAVEL TIME | LINK NUMBER |
|---|---|
| 10:00:00 | 1 |
| 10:00:01 | 2 |
| 10:00:02 | 3 |
| 10:00:03 | 4 |
| 10:00:04 | 5 |
| 10:00:05 | 5 |
| 10:00:06 | 6 |

FIG. 12(a)

BEFORE CORRECTION

| TRAVEL TIME | LINK NUMBER |
|---|---|
| 10:00:00 | 1 |
| 10:00:01 | 1 |
| 10:00:02 | 98 |
| 10:00:03 | 98 |
| 10:00:04 | 3 |
| 10:00:05 | 3 |
| 10:00:06 | 3 |

FIG. 12(b)

AFTER CORRECTION

| TRAVEL TIME | LINK NUMBER |
|---|---|
| 10:00:00 | 1 |
| 10:00:01 | 1 |
| 10:00:02 | 2 |
| 10:00:03 | 2 |
| 10:00:04 | 3 |
| 10:00:05 | 3 |
| 10:00:06 | 3 |

NAVIGATION APPARATUS, NAVIGATION METHOD, AND NAVIGATION PROGRAM

Matter enclosed in heavy brackets [ ] appears in the original patent but forms no part of this reissue specification; matter printed in italics indicates the additions made by reissue.

INCORPORATION BY REFERENCE

[This application is a division of U.S. application Ser. No. 11/104,575, filed Apr. 13, 2005. The disclosure of Japanese Patent Applications No. 2004-126955 filed on Apr. 22, 2004 and No. 2004-126962 filed on Apr. 22, 2004 including the specifications, drawings and abstracts are incorporated herein by reference in their entirety.] *This is a Reissue Application of U.S. Pat. No. 7,634,355, which issued Dec. 15, 2009 from U.S. patent application Ser. No. 12/003,019, filed Dec. 19, 2007, which is a division of U.S. patent application Ser. No. 11/104, 575, filed Apr. 13, 2005 (now U.S. Pat. No. 7,328,101, issued Feb. 5, 2008). The disclosure of the prior applications, along with the disclosure of Japanese Patent Applications No. 2004-126955, filed on Apr. 22, 2004 and No. 2004-126962, filed on Apr. 22, 2004, including the specifications, drawings and abstracts are incorporated herein by reference in their entirety.*

BACKGROUND

1. Related Technical Fields

Related fields include a navigation apparatus and a navigation method.

2. Description of Related Art

In a conventional navigation system, for example, traffic information such as traffic congestion information is received from a road traffic information communication system and stored. The stored information is used for searching for a shortest route (refer to, for example, Japanese Unexamined Patent Application Publication No. 2002-148067).

SUMMARY

According to the aforementioned navigation system, traffic information data received from the road traffic information communication system is only for limited roads. Without storing accurate traffic information data relevant to every road, the navigation apparatus is less likely to identify the most suitable route.

In general, various kinds of useful traffic information data exist other than traffic information data from the road traffic information communication system. For example, travel history data from a probe car (hereinafter referred to as probe data) and road traffic sensor census data are available.

In order to accurate traffic information data relevant to every road, it is beneficial to provide a navigation system and a navigation method to obtain various kinds of traffic information data in accordance with established data precision priorities.

Various exemplary implementations provide a navigation apparatus, including a controller. The controller may store a plurality of types of past traffic information, each type of past traffic information having a priority and may merge the stored past traffic information in accordance the priorities.

Various exemplary implementations provide a navigation method. The method may include the steps of storing a plurality of types of past traffic information, each type of past traffic information having a priority and merging the stored past traffic information in accordance the priorities.

Various exemplary implementations provide a navigation program. The program may include instructions for storing a plurality of types of past traffic information, each type of past traffic information having a priority and instructions for merging the stored past traffic information in accordance the priorities.

Various exemplary implementations provide a navigation apparatus that corrects traffic information data, the traffic information data including travel history data for a plurality of links, the apparatus comprising a controller. The controller may detect adjacency relationships among the plurality of links; and, if a detected link number indicates that the corresponding link is not adjacent to adjacent links, replaces the detected link number for the link, the replaced link number indicating that the link is adjacent to the adjacent links.

Various exemplary implementations provide a navigation method for correcting traffic information data, the traffic information data including travel history data for a plurality of links. The method may include the steps of detecting adjacency relationships among the plurality of links; and replacing, if a detected link number indicates that the corresponding link is not adjacent to adjacent links, the detected link number for the link, the replaced link number indicating that the link is adjacent to the adjacent links.

Various exemplary implementations provide a navigation program for correcting traffic information data, the traffic information data including travel history data for a plurality of links. The program may include instructions for detecting adjacency relationships among the plurality of links; and instructions for replacing, if a detected link number indicates that the corresponding link is not adjacent to adjacent links, the detected link number for the link, the replaced link number indicating that the link is adjacent to the adjacent links.

BRIEF DESCRIPTION OF THE DRAWINGS

Exemplary implementations will now be described with reference to the accompanying drawings, wherein:

FIGS. 9(a) and 9(b) are diagrams showing a correction of travel times and link numbers;

FIGS. 10(a) and (b) are diagrams showing a correction of travel times and link numbers;

FIGS. 11(a) and (b) are diagrams showing a correction of travel times and link numbers; and FIGS. 12(a) and (b) are diagrams showing a correction of travel times and link numbers.

DETAILED DESCRIPTION OF EXEMPLARY IMPLEMENTATIONS

Figure 1:
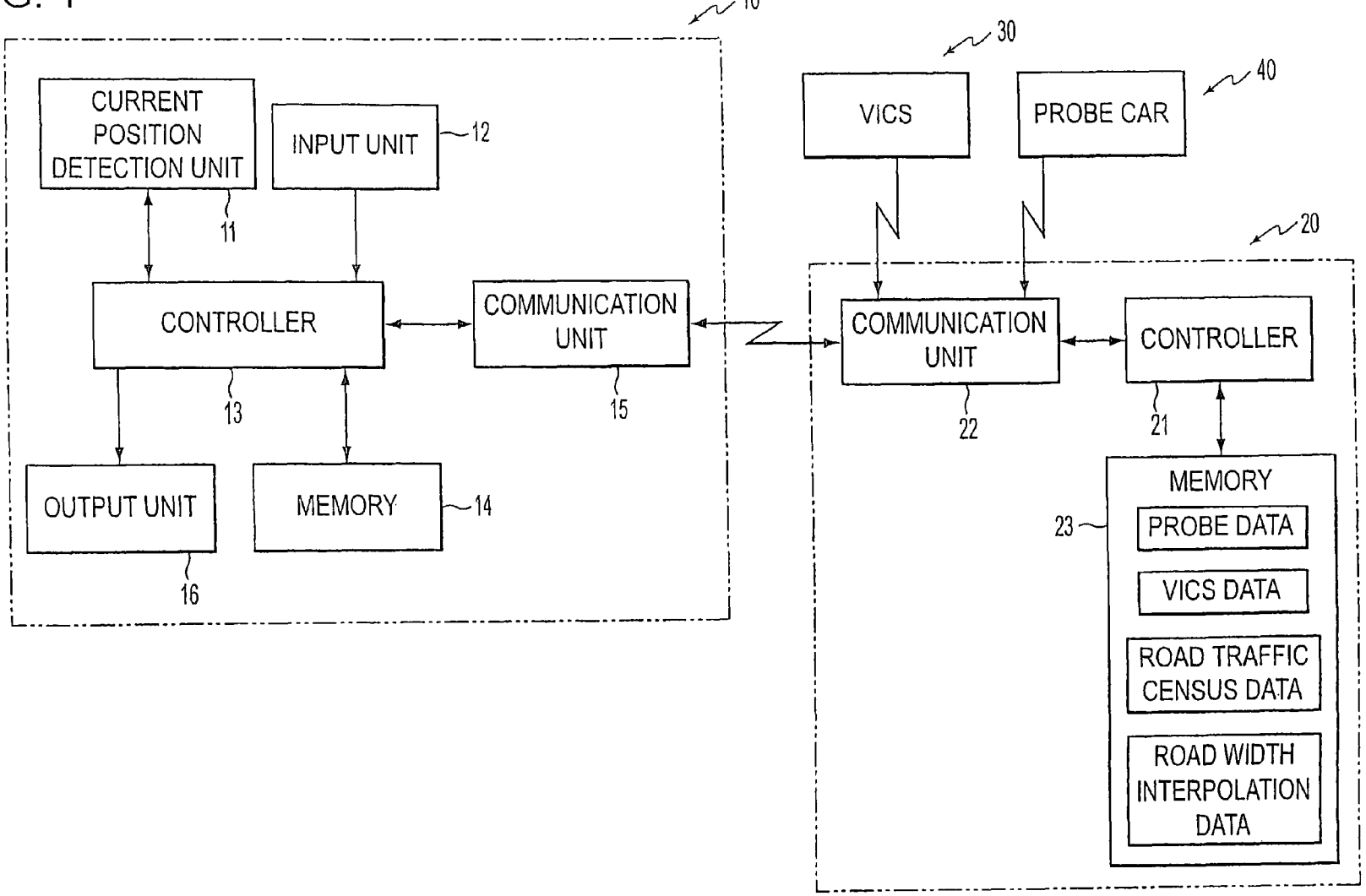
FIG. 1 is a block diagram showing a navigation apparatus according to an exemplary implementation of the principles described herein.

FIG. 1 is a diagram showing an exemplary vehicle navigation system. The vehicle navigation system 10 may include, for example, a current position detection unit 11, and/or a GPS receiver that receives radio waves sent from an artificial satellite of a satellite navigation system (also known as GPS) and detects a current position of the vehicle as well as a present day and time.

In addition, the navigation system 10 may include, for example, an input unit 12 such as, for example, a portable remote controller, the operation of which may send required information through transmission to, for example, a receiving section (not shown) of a controller 13 (described later). Note that instead of, or in addition to, using the above remote controller as the input unit 12, a touch panel may be provided on a display screen, for example, in a liquid crystal display panel of an output unit 16 (described later).

Furthermore, the navigation system 10 may include, for example, the controller 13, a memory 14, a communication unit 15, and/or the output unit 16. The controller 13 may include, for example, a CPU, a RAM, a ROM and/or the receiving sections described above interconnected via, for example, bus lines.

The controller 13 may provide route guidance of the vehicle and display maps based upon, for example, detection output of the current position detection unit 11, operation of the input unit 12, information stored in the memory 14, output of the communication unit 15, and/or output of an exclusive information communication system 20 (described later).

The memory 14 may include, for example, a hard disk. For example, map data and/or traffic information data may be stored in the memory 14 in the form of, for example, a database that is readable by the controller 13. The communication unit 15 may receive, for example, road traffic information from the exclusive information communication system 20 and may output the data to the controller 13.

The exclusive information communication system 20, for example, installed in an exclusive information center, may execute wireless communication with, for example, the communication unit 15, a road traffic information communication system installed in a road traffic information center (hereinafter also referred to as VICS® 30), and/or the probe car 40.

Furthermore, the exclusive information communication system 20 may include, for example, a controller 21, a communication unit 22, and/or a memory 23. The controller 21 may transmit search data, for example according to one or more of the exemplary methods shown in FIGS. 2-4. For example, the controller 21 may communicate with the communication unit 15, VICS 30, and/or the probe car 40 via the communication unit 22. Note that instructions for implementing one or more of the exemplary methods shown in FIGS. 2-4 may be written in advance, for example, on a ROM of the controller 21.

Accumulated probe data, VICS data, road traffic census data, road width interpolation data, and/or link travel times based on such each data may be stored in a the memory 23, for example, as statistical data in the form of a database.

The output unit 16 may include, for example, a display device. Based upon control by the controller 13, the output unit 16 may display information required for the vehicle. Note that the output unit 13 may be installed in an instrument panel on an anterior wall of the vehicle and may display information on a display panel such as a liquid crystal panel.

Figure 2:
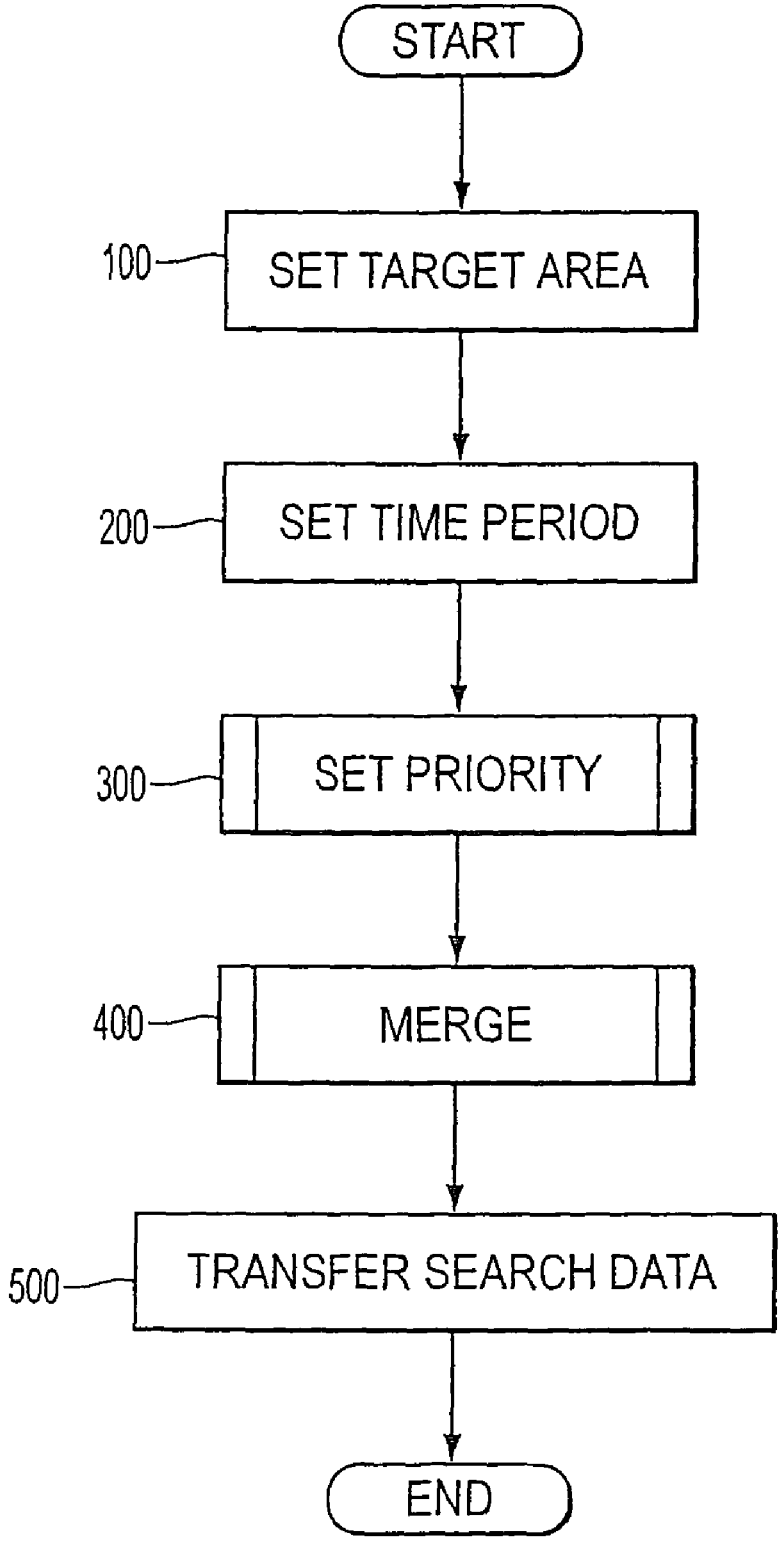
FIG. 2 is a flowchart showing a method of transmitting search data according to an exemplary implementation of the principles described herein.

As described above, the controller 21 may transmit search data according to the exemplary method shown in FIG. 2. FIG. 2 shows an exemplary method of transmitting search data. As shown in FIG. 2, operation of the method begins in step 100 where a target area is set. For example, map data stored in the memory 14 may be divided into one or more target areas defined by predetermined regions, such as, for example, prefectual regions.

Next, in step 200, a time period is set. For example, stored data may be merged in accordance with priorities of the stored data (described later) so the time period is set based on the priorities. The time period may be set, for example, on a 24-hour basis.

In step 300, a priority is set. The priority may be set, for example, according to the exemplary priority setting method shown in FIG. 3. Then, in step 400, the search data is merged. The search data may be merged, for example, according to the exemplary method of merging data shown in FIG. 4. In step 500, the search data is transmitted. For example, the communication unit 22 may send the merged search data as data necessary for searching for a route to the controller 13 via the communication unit 15 and the data may be stored in the database of the memory 14. Operation of the method ends.

Figure 3:
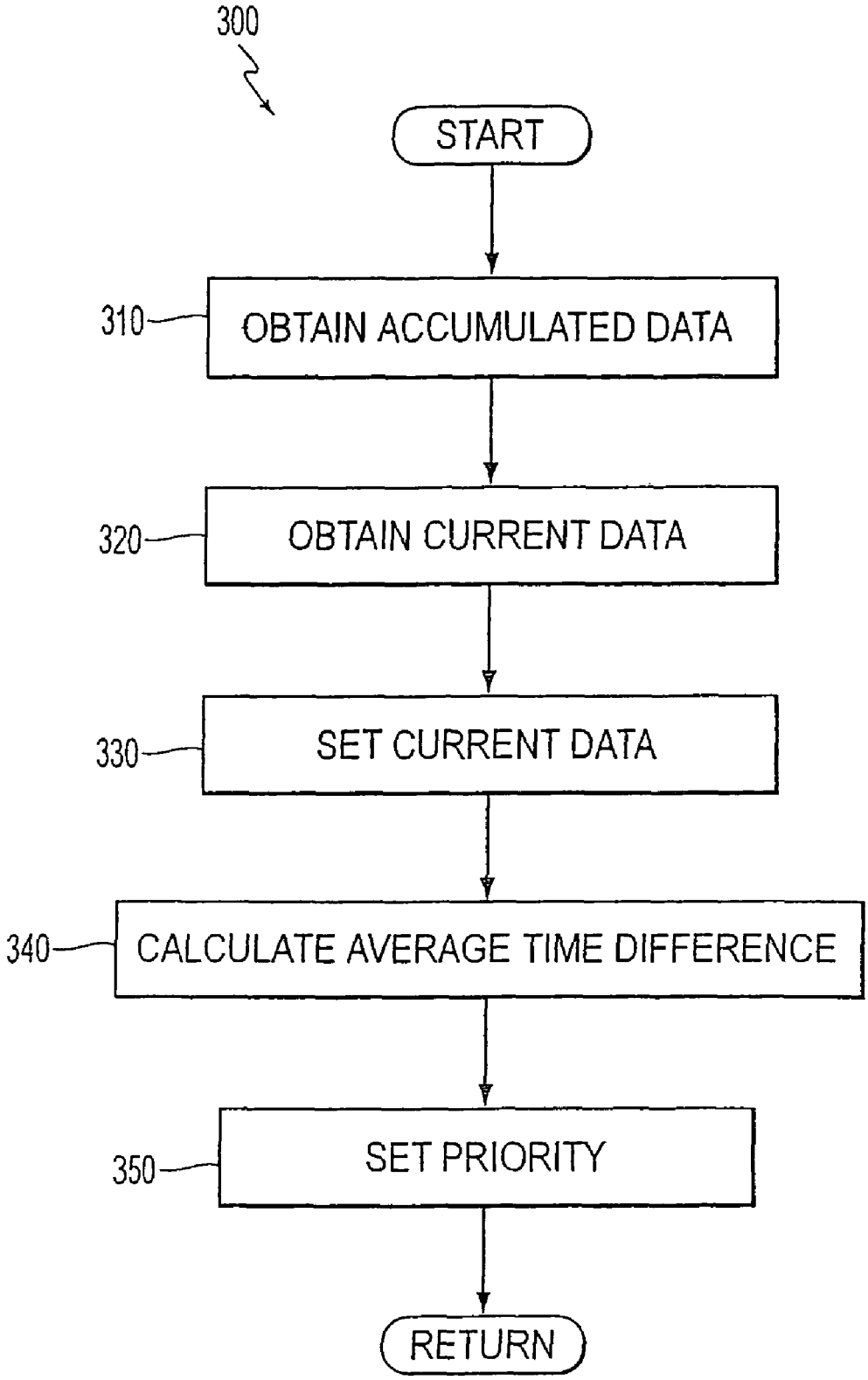
FIG. 3 is a detailed flowchart showing a method of setting priority according to an exemplary implementation of the principles described herein.

As described above, the controller 21 may set priority data according to the exemplary method shown in FIG. 3. FIG. 3 shows an exemplary method of setting priority. As shown in FIG. 3, in step 310, accumulated data is obtained. For example, data at a current time for each target area (for example, set in step 100) may be obtained from a database of the memory 23, and may include, for example, accumulated probe data, VICS data, and/or road traffic census data.

Next, in step 320, current data is obtained. For example, the communication unit 22 may receive current probe data corresponding to the current time from the probe car 40 and provide it to the controller 21. The communication unit 22 may also receive current VICS data from the VICS 30 and provide it to the controller 21.

In step 330, current data is set. For example, data including, for example, current probe data obtained in step 320 and/or current VICS data for links whose data are not included in the current probe data may be set as current data.

As used herein, the term "link" refers to, for example, a road or portion of a road. For example, according to one type of road data, each road may consist of a plurality of componential units called links. Each link may be separated and defined by, for example, an intersection, an intersection having more than three roads, a curve, and/or a point at which the road type changes.

Next in step 340, for each link that exists in both the current probe data and current VICS data, a time difference may be calculated between the link travel time according to accumulated probe data and the link travel time according to the current data set in step 330. After each time difference for each link is calculated, the average value of the calculated time differences (hereinafter referred to as average time difference) may be further calculated for each target area (set in step 100). In a similar manner, for example, an average time difference between accumulated VICS data and the current data, and average time difference between road traffic census data and the current data may be calculated.

In step 350, priority is set. For example, based on the average time differences in step 340, priorities for accumulated road traffic census data, VICS data, and probe data may be established.

For example, according to the current time, if the average time difference of road traffic census data, the average time difference of VICS data, and the average time difference of probe data are ranked in descending order according to the of amount of average time difference, the priorities may be established according to that order. According to this example, assume a priority variable n=1 for road traffic census data, n=2 for accumulated VICS data, and n=3 for stored probe data.

Figure 4:
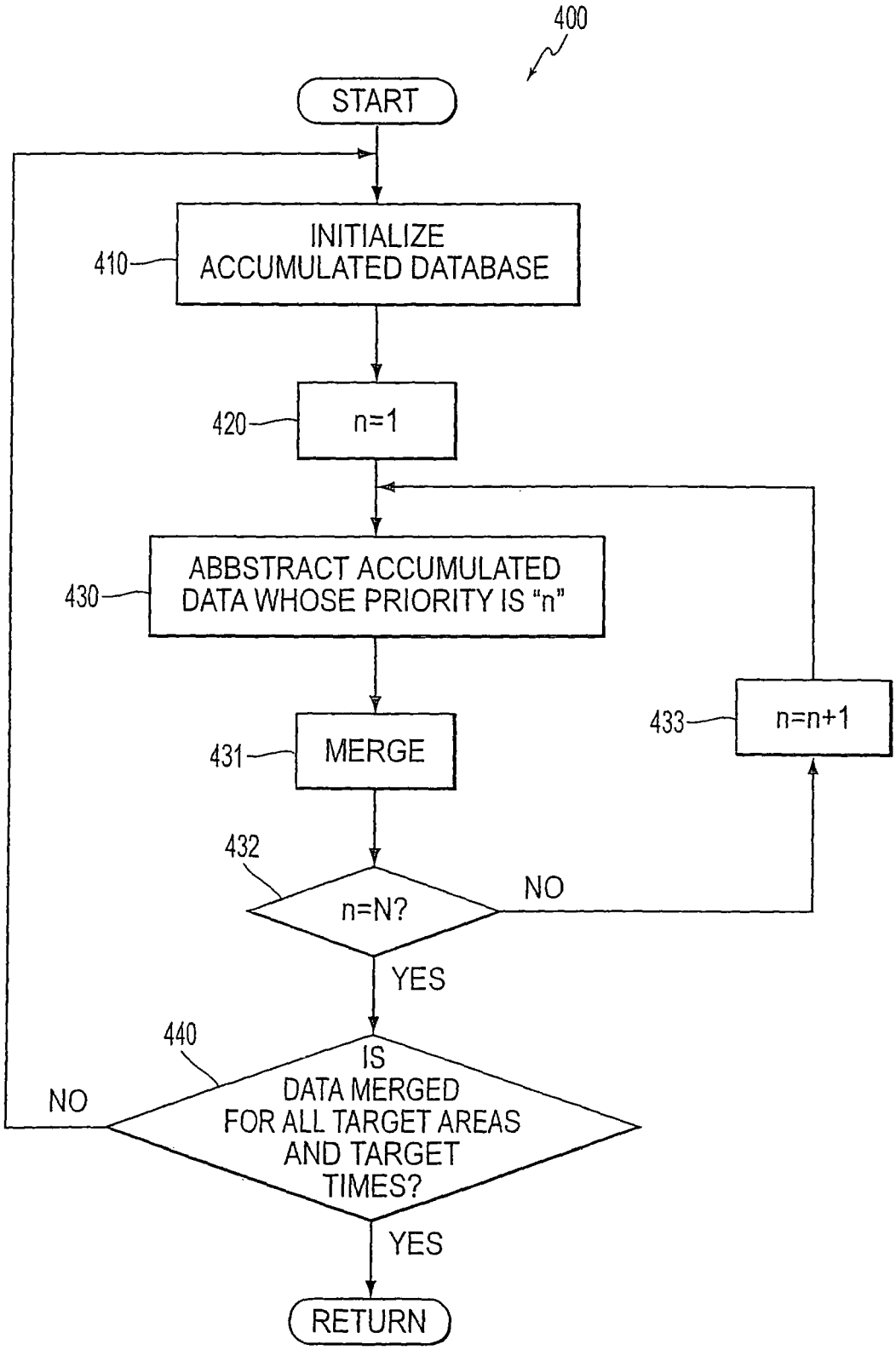
FIG. 4 is a detailed flowchart showing a method of merging data according to an exemplary implementation of the principles described herein.

As described above, the controller 21 may merge data according to the exemplary method shown in FIG. 4. FIG. 4 shows an exemplary method of merging data. As shown in FIG. 4, in step 410, accumulated navigation data is initialized. For example, road width interpolation data at a desired time (for example, eight o'clock) for a target area may be read out from a database of the memory 14.

As used herein, "road width interpolation data" is data that represents an estimated time required to travel a link. The time required to travel the link is estimated based on the type of road the link represents (e.g., local road, expressway, etc.) and may be adjusted based on the width of the road the link represents (e.g., two lanes, 4 lanes, etc.). Thus, according to this example, road width interpolation data at the desired time of eight o'clock would indicate, that based on the width of the road, it will take 11 minutes to travel the link at eight o'clock.

Then, in step 420, variable n is set as 1. In step 430, data whose priority N is equal to the n may be extracted from the accumulated data. For example, among accumulated road traffic census data corresponding to n=1 for the target area, only data at the target time (for example, eight o'clock) may be read out from the memory 14.

Next, in step 431, the read out data is merged. According to this example, road width interpolation data read out in step 410 may be overwritten with road traffic census data read out in step 430. If, for example, a link includes no road traffic census data but only road width interpolation data, the road width interpolation data may be used for that link.

In step 432, it is determined whether n=N. N denotes a total number of types of data prioritized, for example, in step 350. In this example, N=3 because there are three types of prioritized data: road traffic census data, accumulated VICS data, and stored probe data. If n≠N, then operation continues to step 433. If n=N, operation jumps to step 440.

In step 433, the variable n is updated to n=n+1. According to this example, n=n+1=2. Thus, when returning to step 430, accumulated VICS data corresponding to n=2 for the target area, and at the target time (for example, eight o'clock) may be read out from the database of the memory 14.

When returning to step 431, the read out data is merged. According to this example, accumulated data, which includes the merged road traffic census data from the previous step 431, may be overwritten with VICS data read out in step 430. If a link includes no accumulated VICS data but only accumulated data (which includes merged road traffic census data) the road traffic census data may be used for that link.

According to this example, in step 433, the variable n is updated to n=n+1=3. In step 430, accumulated probe data corresponding to n=3 for the target area and at the target time (for example, eight o'clock) may be read out from the database of the memory 14.

When returning to step 431, the read out data is merged. For example, accumulated data, which includes merged VICS data and merged traffic census data from previous steps 431 may be overwritten with probe data read out in step 430. If a link includes no accumulated probe data but only accumulated data, the VICS data may be used for that link.

According to this example, n=N=3 in step 432. It should be appreciated that steps 410-433 may be repeated for each target area at each target time.

In step 440, it is determined whether all data has been merged for all target areas set in step 100 and also relevant to each target time in a period of time set in step 200. If the data has not been merged for all target areas and all target times, operation returns to step 410. If the data has been merged for all target areas and all target times, operation ends.

According to the above exemplary implementation, a plurality of types of data exists, which may include redundant information. An average time difference between current data and stored data is calculated for each type of accumulated data, and a priority is established based on the size of the difference. Then each type of data is merged with the stored accumulated data according to the established priority. Because many sources and/or types of data may be preferentially merged, reliable traffic information may be obtained for a greater number of links compared to using just one source of data. Thus, accurate traffic information for a larger area may be transmitted for a high-quality route search. In addition, priorities are established for each predetermined area, so that it is possible to provide applicable search database in view of regional characteristics.

According to the above exemplary implementation it is possible to search for a guidance route based on accumulated data necessary for search in the database of the memory 14. Therefore, the route may be searched within a wider target area since, due to the merging of many sources of data, highly accurate traffic congestion information is available for a greater number of links.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

For example, in step 350 priorities may be established for each type of accumulated data in advance. In step 330, as described above, when current probe data and current VICS data exist redundantly, current probe data is applied for current data. However, current data may be created by weighting both of current probe data and current VICS data and averaging both of them.

In step 431 as described above, data is merged by overwriting accumulated data in a database. However, it is also possible to set each specified ratio for each type of stored data in order of the priorities and merge data by multiplying each stored data by each specified ratio and averaging the calculation results.

In steps 100 through 400, for example, the navigation system 10 may directly obtain the data and execute the same operations in step 100 through 400 for the data instead.

Hereinafter, another exemplary implementation of the principles discussed herein will be described. In the first exemplary implementation, accumulated probe data, that is, travel history data recorded by a probe car, is utilized as data for searching for a route. However, such travel history data is not always relevant to all routes. For example, if stored route data does not include travel history data for the target area, the travel history data may be unreliable. Thus, the unreliable travel history data is not useful for searching for a route, displaying traffic information, and so on.

In order to resolve such issues as described above, it is beneficial to correct travel history data.

Figure 5:
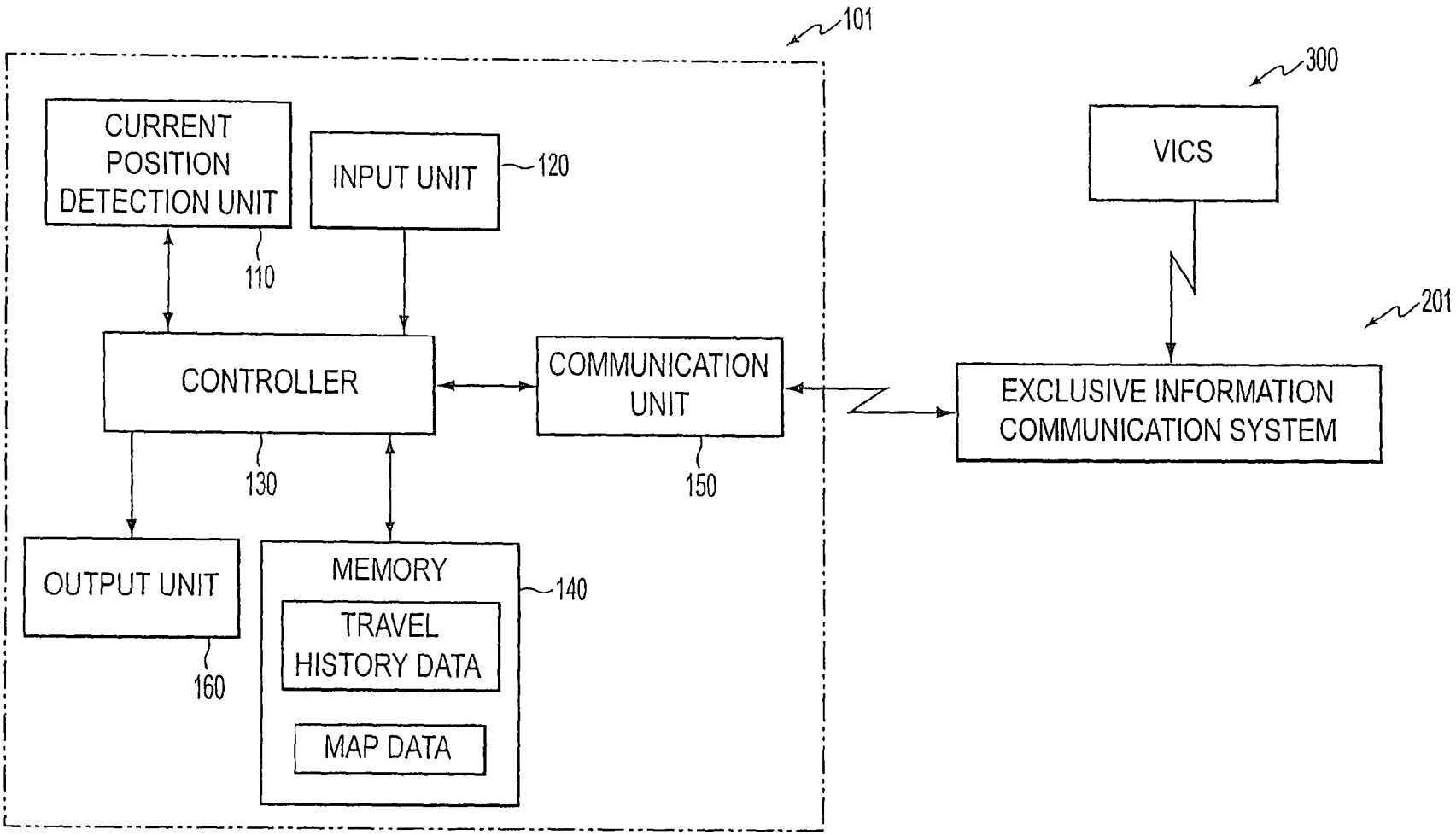
FIG. 5 is a block diagram showing a navigation apparatus according to a according to another exemplary implementation of the principles described herein.

FIG. 5 is a diagram showing an exemplary of a vehicle navigation system. The vehicle navigation system 101 may include, for example, a current position detection unit 110, and/or a GPS receiver that receives radio waves sent from an artificial satellite of a satellite navigation system (also known as GPS) and detects a current position of the vehicle as well as a present day and time.

In addition, the navigation system 101 may include, for example, an input unit 120 such as, for example, a portable remote controller, the operation of which may send transmit information to a receiving section (not shown) of the controller 130 (described later). Note that instead of using the above remote controller as the input unit 120, for example, a touch panel may be provided along a display screen in a liquid crystal display panel of an output unit 160 (described later) may be employed as the input unit 120.

Furthermore, the navigation system 101 may include, for example, the controller 130, a memory 140, a communication unit 150, and/or the output unit 160. The controller 130 may include, for example, a CPU, a RAM, and/or a ROM as well as the receiving sections, for example, interconnected via bus lines.

Figure 6:
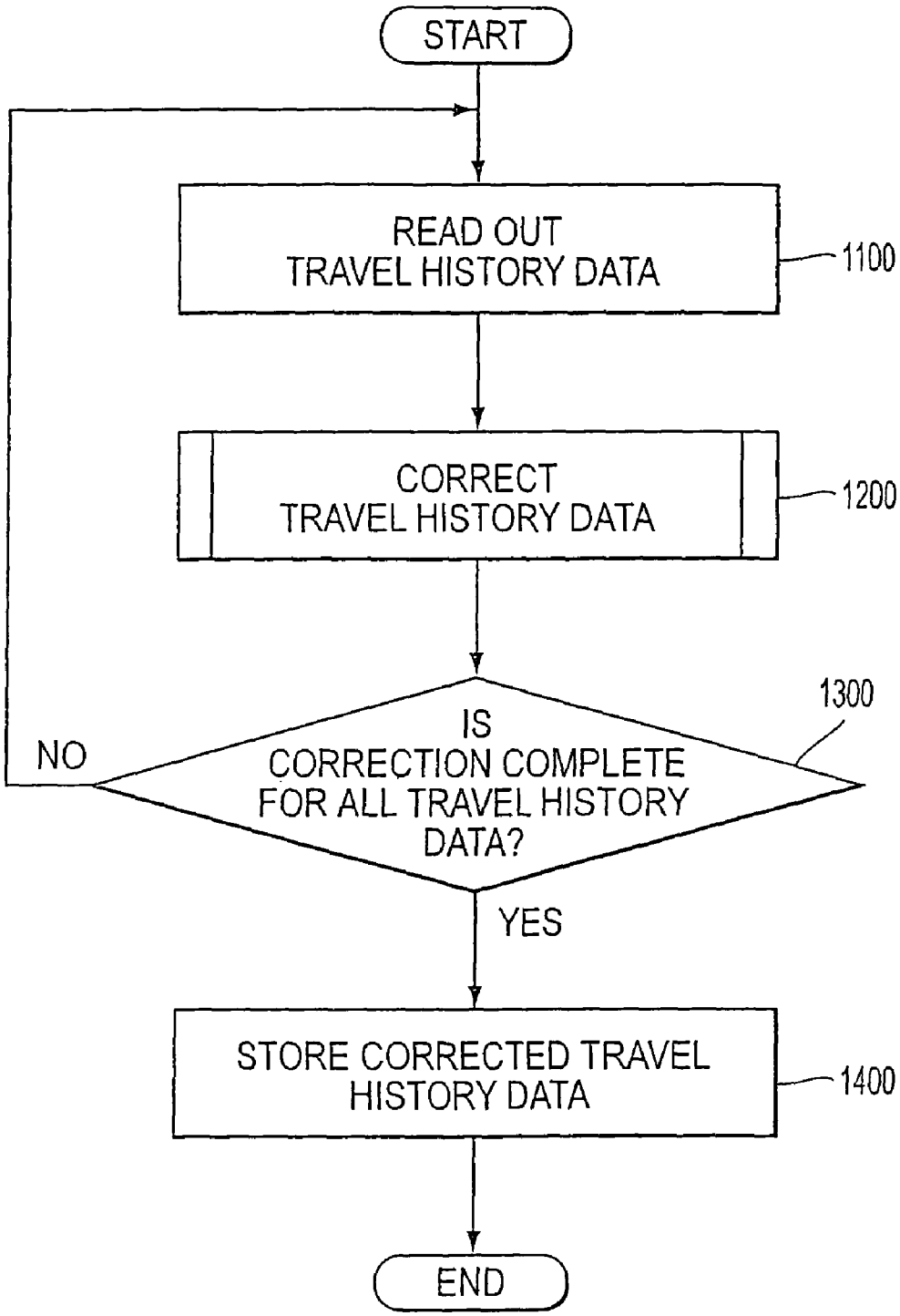
FIG. 6 is a flowchart showing a method of transmitting search data according to another exemplary implementation of the principles described herein.

The controller 130 may transmit search data, for example, according to the exemplary method shown in flowchart in FIG. 6. For example, the controller 130 may provide route guidance of the vehicle and display maps based upon detection output of the current position detection unit 110, operation of the input unit 120, information stored in the memory 140, output of the communication unit 150, and/or output of the exclusive information communication system 201 (described later).

The memory 140 may include, for example, a hard disk. For example, map data and/or travel history data may be stored in the memory 140, for example, in the form of a database that is readable by the controller 130. Note that such travel history data may include link numbers allocated for links as well as passing times, i.e., times at which the links along a vehicle travel route will be passed.

The communication unit 150 may receive road traffic information from the exclusive information communication system 201 and may output it to the controller 130. Furthermore, the exclusive information communication system 201 may transfer various kinds of traffic information data which are received from a road traffic information communication system installed in a road traffic information center (hereinafter also referred to as VICS® 30).

The output unit 160 may include, for example, a display device. Based upon control by the controller 130, the output unit 160 may display information required for the vehicle. Note that the output unit 160 may be installed, for example, in an instrument panel on an anterior wall of the vehicle and may display on a display panel such as a liquid crystal panel.

As discussed above, the controller 130 may transmit search data, for example, according to the exemplary method of transmitting search data shown FIG. 6. As shown in FIG. 6, in step 1100, travel history data is read out. For example, Link numbers allocated for links as well as passing times at the links along a vehicle travel route may be read out from a database of the memory 114. Next, in step 1200, travel history data is corrected. The travel history data may be corrected, for example, according to the exemplary method of correcting travel history data shown in FIGS. 7 and 8.

In step 1300, it is determined whether all of the travel history data is corrected. If all of the travel history data has not been corrected, operation returns to step 110. If all of the travel history data has been corrected, operation continues to step 1400.

In step 1400, the corrected travel history data is stored. For example, the travel history may be stored in a database of the memory 114. Then, operation of the method ends.

Figure 7:
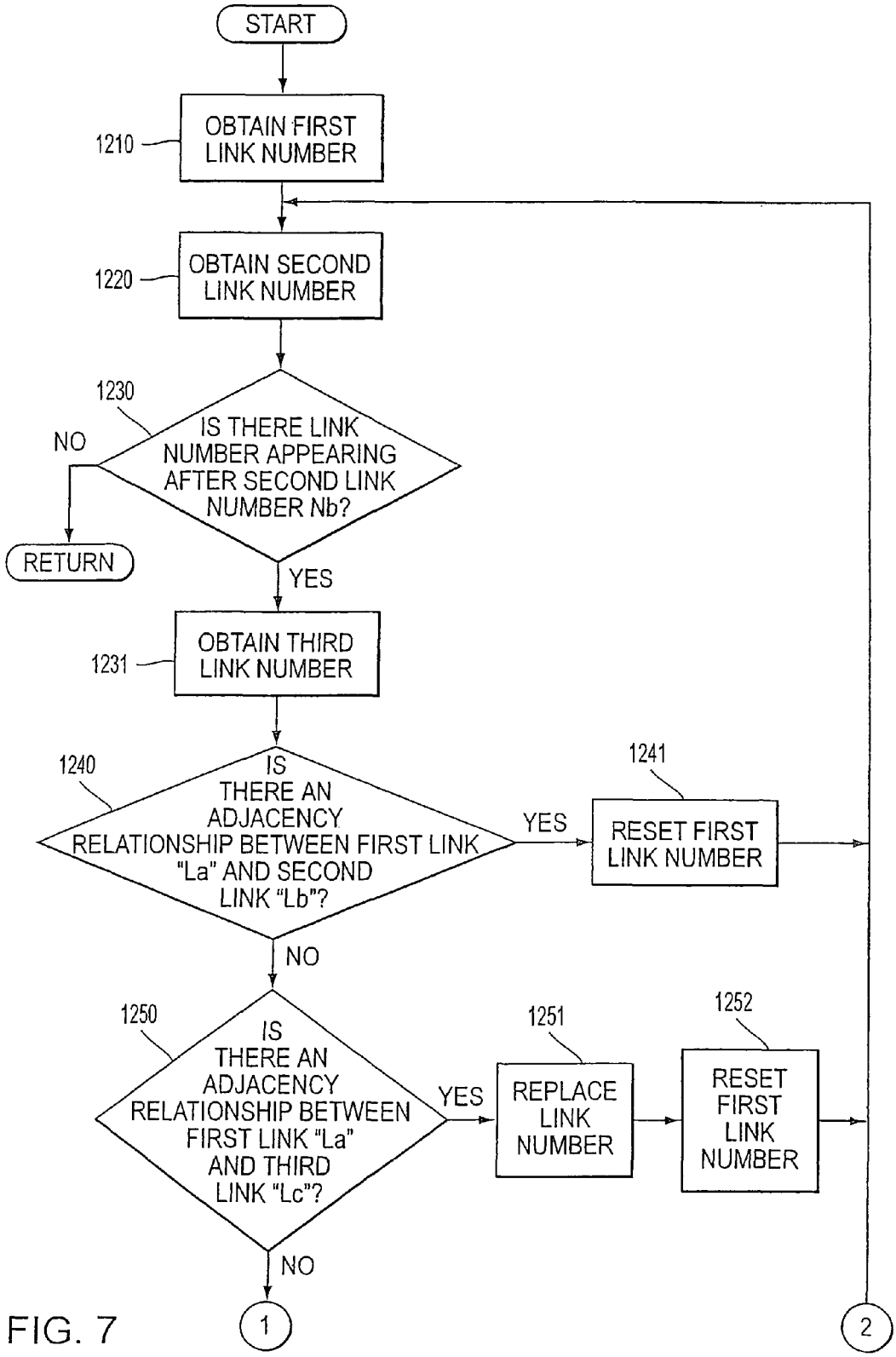
FIG. 7 is a flowchart showing a method of storing corrected travel history data according to an exemplary implementation of the principles described herein.
Figure 8:
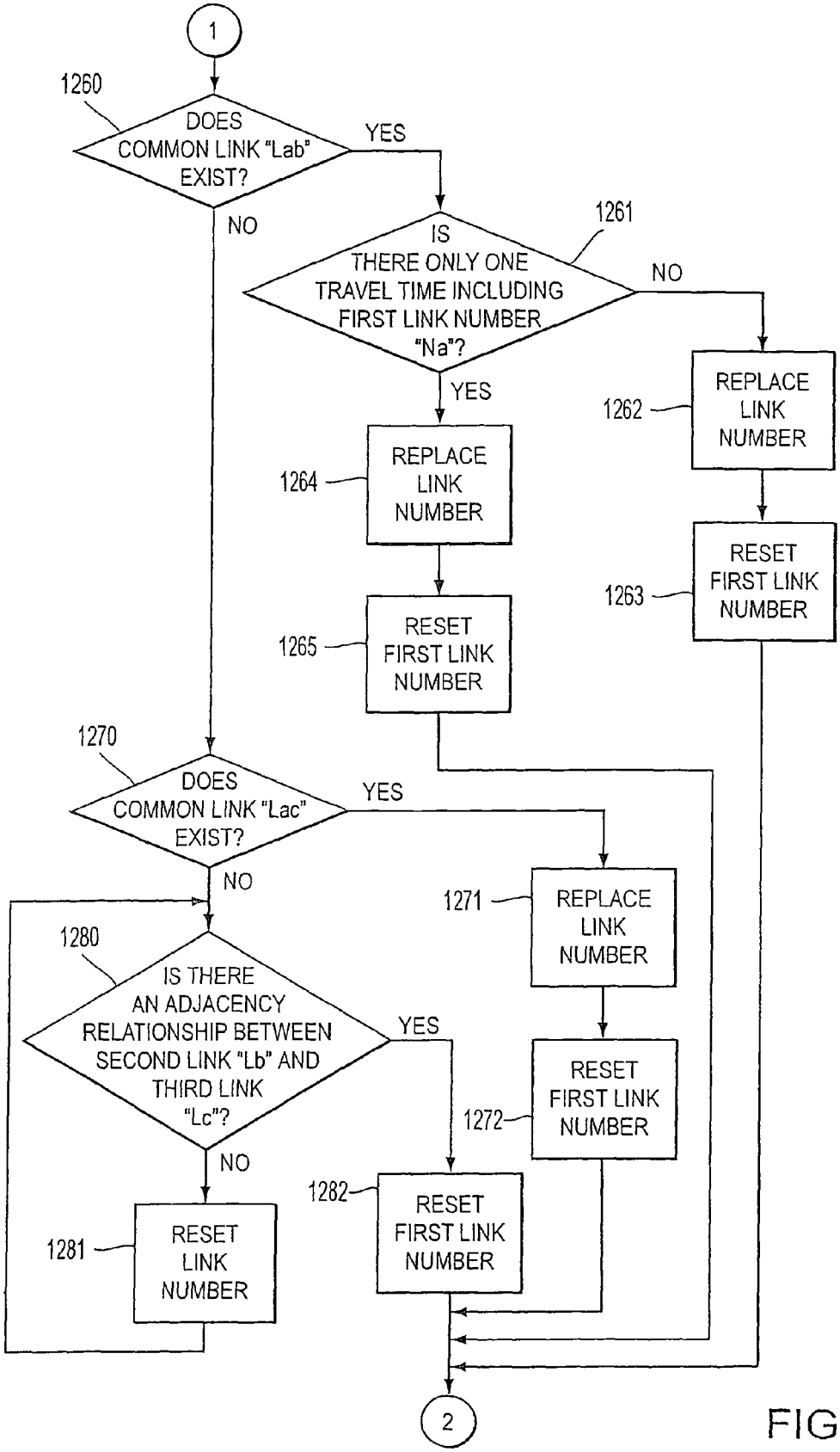
FIG. 8 is a flowchart showing a method of correcting travel history data according to an exemplary implementation of the principles described herein.

As discussed above, the travel history data may be corrected according to the exemplary method shown in FIGS. 7 and 8. As shown in FIGS. 7 and 8, in step 1210, a first link number is obtained. For example, a link number at the earliest time among travel history data, for example, read out in step 1100 is obtained as the first link number Na.

In step 1220, a second link number is obtained. For example, a link number which chronically appears after the first link number Na is obtained as the second link number Nb among the travel history data.

Then in step 1230, it is determined whether there is a link number that chronologically appears after the second link number Nb in the travel history data. If a link number does not chronologically appear after the second link number, operation ends. If a link number chronologically appears after the second link number, operation continues to step 1231. In step 1231, the link number that continuously appears after the second link number Nb is set as the third link number Nc.

Next, in step 1240, it is determined whether the link corresponding to the first link number Na (hereinafter referred to as the first link La) is adjacent to the link corresponding to the second link number Nb (hereinafter referred to as the second link Lb). For the purpose of this example, an adjacency relationship is detected between the first link and the second link when both links are connected with each other in map data.

If the first link La is adjacent to the second link Lb, operation continues to step 1241. If the first link La is not adjacent to the second link Lb, operation jumps to step 1250. In step 1241, the first link number is reset in step 1241. For example, the second link number Nb may be set as the first link number Na. Then, operation returns to step 1220, where a new second link number Nb is obtained.

In step 1250, it is determined whether the first link La and the link corresponding to the third link number Nc (hereinafter referred to as the third link Lc) are adjacent in the map data. If the first link La and the third link Lc are adjacent, operation continues to step 1251. If the first link La and the third link Lc are not adjacent, operation jumps to step 1260.

In step 1251, the second link number Nb is replaced. For example, as shown in FIG. 9(a), the travel history data may include "1"s as the first link numbers Na at traveling time 10:00:00 and 10:00:01, "98"s as the second link numbers Nb at traveling time 10:00:02, 10:00:03, and 10:00:04, and "2"s as the third link numbers Nc at traveling time 10:00:05 and 10:00:06.

Thus, according to this example, the first link La is not connected with the second link Lb on map data because the first link number Na is "1" and the second link number Nb is "98." That is, there is no adjacency relationship between the two links. In addition, according to this example, the first link La is connected with the third link Lc on map data because the first link number Na is "1" and the third link number Nc is "2." There is an adjacency relationship between the first link La and the third link Lc.

Thus, for example, in step 1251, the each second link number Nb at travel time 10:00:02 and 10:00:03 would be replaced with the first link number Na, that is, "1" as shown in FIG. 9(b). The second link number Nb at 10:00:04 would be replaced with the third link number Nc, that is "2" as shown in FIG. 9(b).

By replacing the second link number in step 1251, even if an incorrect link number is allocated for a link which has no relationship with adjacent links (previous/following links), it may be corrected with one or more adjacent link numbers.

Then in step 1252, the first link number is reset. For example, the third link number Nc may be set as the first link number Na. Operation returns to step 1220, where a new second link number is obtained.

In step 1260, it is determined whether there is a link that is adjacent with both of the first link La and the second link Lb in the map data. Hereinafter such an adjacent link is referred to as a common link Lab.

If a common link Lab exists, operation continues to step 1261. If a common link Lab does not exists, operation jumps to step 1270. In step 1261, it is determined whether there is only one travel time including the first link number Na. If there is more than one travel time including the first link number Na, operation continues to step 1262. If there is only one travel time including the first link number Na, operation jumps to step 1264.

For example, as shown in FIG. 10(a), travel history data may include "1"s as the first link numbers Na at traveling time 10:00:00, 10:00:01, and 10:00:02, "3"s as the second link numbers Nb at traveling time 10:00:03 and 10:00:04, and "4"s as the third link numbers Nc at traveling time 10:00:05 and 10:00:06.

According to this example, the first link number Na is "1" and the second link number Nb is "3." Thus, there is a common link Lab having link number "2" in the map data that is adjacent to both the first link La and the second link Lb. According to this example, more than one travel time including the first link number Na exist.

In step 1262, at least part of the first link number Na is replaced. According to this example, the first link number Na at travel time 10:00:02 is replaced with the link number allocated for the common link Lab, that is, "2," as shown in FIG. 10(b). Then, in step 1263, the first link number is reset. For example, the second link number Nb is set as the first link number Na. Operation returns to step 1220.

By replacing at least part of the first link number Na, even if a link number is missing, a link number allocated for a common link "Lab" may be appropriately applied.

In step 1264, one or more link numbers are replaced. For example, as shown in FIG. 11(a), travel history data may include link number "1" s at traveling time 10:00:00 and 10:00:01, "2" at 10:00:02, "3" as the first link number Na at 10:00:03, "5"s as the second link numbers Nb at 10:00:04 and 10:00:05, and "6" as the third link number Nc at 10:00:06.

According to this example, the first link number Na is "3" and the second link number Nb is "5." Thus, there is a common link Lab including link number "4" in the map data which is adjacent to both the first link La and the second link Lb. In addition, in the example, only one travel time including the first link number Na exists.

According to this example, when the link numbers are replaced in step, 1264, the link number at travel time 10:00:01 may be replaced with link number "2," as described in FIG. 11(b). Then the link number at travel time 10:00:02 is replaced with link number "3." The link number at travel time 10:00:03 is replaced with link number "4."

By replacing one or more link numbers in step 1264, even if a link number is missing, a link number allocated for a link which is adjacent to the missing link may be appropriately used. Then, the first link number is reset in step 1265. For example, the second link number Nb is set as the first link number Na, and operation returns to step 1220.

In step 1270, it is determined whether there is a link that is adjacent to both the first link La and the third link Lc in the map data. Hereinafter, such an adjacent link is referred to as a common link Lac.

If a common link Lac exists, operation continues to step 1271. If a common link Lac does not exist, operation jumps to step 1280.

In step 1271, the second link number Nb is replaced with the common link number Lac. For example, as shown in FIG. 12(a), travel history data may include "1"s as the first link numbers Na at traveling times 10:00:00 and 10:00:01, "98"s as the second link numbers Nb at traveling times 10:00:02 and 10:00:03, and "3"s as the third link numbers Nc at traveling times 10:00:04, 10:00:05, and 10:00:06.

According to this example, the first link number Na is "1" and the third link number Nc is "3." Thus, it is determined that there is a common link Lac including link number "2" that is adjacent to both the first link La and the third link Lc. According to this example, in step 1271, the link numbers "98" at travel time 10:00:02 and 10:00:03 would be replaced with the link number allocated for the common link Lac, that is, "2" as shown in FIG. 12(b).

By replacing the second number Nb with the common link Lac number, in step 1271, even if an incorrect link number is allocated for a link which has no relationship with adjacent links, it may be accurately corrected with a link number for a link adjacent to the link in question. In step 1272, the first link number is reset in step 1272. For example, the third link number Nc is set as the first link number Na, and operation returns to step 1220.

In step 1280, it is determined whether there is an adjacency relationship between the second link Lb and the third link Lc in the map data. If the second link Lb is not adjacent to the third link Lc in the map data, operation continues to step 1281. If the second link Lb is adjacent to the third link Lc in the map data, operation jumps to step 1282.

In step 1281, the third link number Nc is set as the second link number Nb and a link number that chronologically appears after the replaced second link number Nb is set as the third link number Nc among travel history data. Then, operation returns to step 1280.

In step 1282, the third link number Nc is set as the first link number Na and operation returns to step 1220.

As described above, if there is no remaining link number which continuously appears after the second link number Nb, for example, if the second link Lb is adjacent to a destination for the travel history data, operation of the exemplary method ends.

According to the above described exemplary methods shown in FIGS. 6-8, the controller 113 may search for a guidance route based on, for example a request for display by the input unit 112. During the route search, the controller 113 may, for example, search for a route and/or display traffic information, based on the corrected travel history data, for example, stored in the database of the memory 114. Therefore, after the correction, a reliable route may be searched and traffic information may be correctly displayed with using the dependable travel history data.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

For example, in step 1251, if the first link La is not adjacent to the second link Lb in the map data, but the first link La is adjacent to the third link Lc (e.g., there is an incorrect link number between two adjacent links), part of the second link numbers Nb that are close to the first link La may be replaced with the first link number Na and the remaining second link numbers Nb may be replaced with the third link number Nc.

In this manner, for example in FIG. 9(a), if odd number of second link numbers Nb exist in one group, the middle link number in the group (that corresponds to the travel time 10:00:03) may be replaced with the first link number Na.

In step 1262, if the first link La and the second link Lb or the first link La and the third link Lc are not adjacent in the map data, a common link Lab that is adjacent to both of the first link La and the second link Lb exists, and if more than one travel history data including the first link number Na exist, the link number for the common link Lab may be replaced with the link number at the last travel time for the first link La. For example, as shown in FIGS. 10(a) and 10(b), if a necessary link number "2" for a common link Lab is missing between the first link number "1" and the second link number "3", the link number "1" for the last travel time of the first link, may be changed to "2."

In step 1264, if the first link La and the second link Lb are not adjacent, the first link La and the third link Lc are not adjacent, a common link Lab which is adjacent to both of the first link La and the second link Lb exists, and if only one travel history data including the first link number Na exists, a link number that appears before the first link number with a plurality of travel history data may be referenced and used to assign the missing link numbers.

For example, as shown in FIGS. 11(a) and 11(b), a necessary link number "4" for a common link Lab is missing between the first link number "3" and the second link number "5," and there is only one travel history data for the first link "3" (i.e., 10:00:03). The link which appears before the first link and which has more than one travel history data, may have the link number for the last travel history data increased, and the first link adjusted accordingly. Thus, as shown in FIGS. 11(a) and 11(b), the link number "1" is the first link that appears before the first link number "3" having more than one travel history data, 10:00:01 and 10:00:02. The last travel history data is for link number "1" is increased to link number "2" and the remaining links "2" and the first link "3" are each increased by one accordingly.

In step 1271, if the first link La and the second link Lb are not adjacent or the first link La and the third link Lc are not adjacent, if there is no common link Lab which is adjacent to both of the first link La and the second link Lb, and if a common link Lac which is adjacent to both of the first link La and the third link Lc is found (i.e., a necessary link number allocated for a common link Lac is missing between the first link number Na and the third link number Nc and an incorrect link number exists instead) the second link number Nb may be replaced with the link number allocated for the common link Lac For example, as shown in FIG. 12(a), if a first link number "1" and a second link number "98" are not adjacent, a first link number "1" and a third link number "3" are not adjacent, and a common link number "2" is found which is adjacent to both the first and third link, the second link number "98" may be replaced with the common link number "2." Accordingly, as shown in FIG. 12(b) the non-adjacent link number "98" may be replaced with the adjacent link number "2" and each of the first link "1," the replaced second link "2," and the third link "3" will be correctly adjacent and in order.

The above-described travel history data correction apparatus 101, comprises a controller that stores vehicle travel data taken in the past as travel history data associated with a plurality of link numbers, detects adjacency relationships among the plurality of link numbers (e.g., steps 1240, 1250), and replaces a link number allocated for a link which has no relationship with adjacent links with at least one link number allocated for a link which has a relationship with adjacent links based on the detection by the controller (e.g., steps 1251, 1262, 1264, 1271).

By replacing link numbers, an incorrect link number allocated for a link which has no relationship with adjacent links may be accurately corrected with at least one link number allocated for a link which has a relationship with adjacent links. Therefore, after the correction, a reliable route may be searched and traffic information may be correctly displayed with using the dependable travel history data.

Further, the travel history data correction apparatus 101 comprises a controller 113 that detects a current position (via current position detection unit 111). The controller 113 may store a link number corresponding to the current position as travel history data.

The travel history data correction apparatus 101 comprises the controller 113 that may store vehicle travel data taken in the past as travel history data associated with a plurality of link numbers as well as times to pass through the links, and then the controller 113 may, if there is a link which has no relationship with adjacent links, replace the link number with at least one link number allocated for a link which has a relationship with adjacent links based on a time to pass through the link.

The travel history data correction apparatus 101, comprises the controller 113 that stores vehicle travel data taken in the past as travel history data associated with a plurality of link numbers, for example in memory 114, determines whether there a first link La that is allocated a first link number Na is adjacent to and a second link Lb that chronologically appears after the first link number and that is allocated at least one second link number Nb. (e.g., step 1240). The controller 113 determines from the travel history data whether there is the first link La is adjacent to a third link Lc that chronologically appears after the second link number and which is allocated a third link number (Nc) (e.g., step 1250). If the controller 113 detects that the first link La and the third link Lc, the controller 113 replaces the second link number with at least one first link number and/or third link number (e.g., step 1251).

By replacing the link numbers, an incorrect link number allocated for a link which has no relationship with adjacent links may be accurately corrected with at least one previous and/or following link number. Therefore, a reliable route may be searched and traffic information may be correctly displayed with using the dependable travel history data.

The controller 113 detects whether the first link La and the third link Lc are adjacent. The controller 113 detects whether there is a first common link Lab which connects with both of the first link La and the second link Lb (e.g., step 1260), and replaces a link number at a last time for the first link La with a link number allocated for the first common link Lab if the first link La is not adjacent to the second link Lb, the second link is not adjacent to the third link Lc, and if the first common link is detected (e.g., steps 1262, 1264).

By replacing link numbers, even if a link number is missing, a link number allocated for a common link may be appropriately used.

The travel history data correction apparatus 101 includes a controller 113 that detects whether there is only one travel history data including the first link number, stores vehicle travel history as travel history data in relationship to a plurality of link numbers and travel times. If a first link La and a second link Lb are not adjacent, the first link La and a third link Lc are not adjacent, a common link Lab which is adjacent to both of the first link La and the second link Lb exists, and only one travel history data including the first link number Na exists, the controller 113 may reference a link number that appears before the first link number and has a plurality of travel times (travel history data), to assign missing link numbers.

For example, as shown in FIGS. 11(a) and 11(b), a necessary link number "4" for a common link Lab is missing between the first link number "3" and the second link number "5," and there is only one travel history data for the first link "3" (i.e., 10:00:03). The controller may increase the link number for the last travel history data of a link which appears before the first link and which has more than one travel history data, and may adjust the following link numbers accordingly. Thus, as shown in FIGS. 11(a) and 11(b), the link number "11" is the first link that appears before the first link number "3" having more than one travel history data, 10:00:01 and 10:00:02. The last travel history data is for link number "1" is increased to link number "2" and the remaining links "2" and the first link "3" are each increased by one accordingly.

By executing such replacing processing, even if a link number is missing, a link number adjacent to the missing link number may be appropriately used.

The travel history data correction apparatus 101, including controller 113 detects whether the first link La and the third link Lc are adjacent, detects whether there is a first common link Lab that connects both of the first link La and the second link Lb, and detects whether there is a second common link Lac which connects with both of the first link La and the third link Lc (e.g., step 1270). The controller 113 replaces a link number for the second link Lb with a link number allocated for the second common link Lac (e.g., step 1271), when the first link La and the third link Lc are not adjacent and there is not a first common link Lab that connects both of the first link La and the second link Lb, and a common link Lac is found.

By replacing link numbers, an incorrect link number allocated for a link which has no relationship with adjacent links may be accurately corrected with a link number allocated for a link adjacent to the link in question.

If there is a link which has no relationship with adjacent links, the link number may be replaced with at least one link number allocated for a link which has a relationship with adjacent links in view of adjacency relationships among the plurality of link numbers.

By executing such replacing processing, an incorrect link number allocated for a link which has no relationship with adjacent links may be accurately corrected with at least one link number allocated for a link which has a relationship with adjacent links.

When vehicle travel data taken in the past is stored as travel history data associated with a plurality of link numbers, the first link La including the first link number Na is not adjacent to the second link Lb including at least one second link number Nb which appears right after the first link number, it may be determined whether the first link La is adjacent to the third link Lc including the third link number Nc. The second link number Nb may then be replaced with at least one first link number Na and/or at least one third link number Nc in the travel history data.

By replacing link numbers, an incorrect link number allocated for a link which has no relationship with adjacent links may be accurately corrected with at least one previous and/or following link number.

Note that, for ease of explanation, the above-described apparatus and methods are described with the aid of reference numerals. It should be appreciated that the respective structure and method steps represented by the reference numerals are merely exemplary.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

[1. A travel history data correction apparatus, comprising:

a memory that stores:

map data comprising connection relationships of links; and vehicle travel history data for a plurality of the links along a vehicle travel route, each of the plurality of the links having a link number; and a controller that:

detects adjacency relationships among the plurality of the links based on the map data; and replaces a link having a link number indicating that there is no adjacency relationship for the link in the vehicle travel history data with another link having another link number indicating that there is an adjacency relationship for the other link.]

[2. The travel history data correction apparatus according to claim 1, wherein the controller:

detects a current vehicle position; and stores a current link number corresponding to the current position as the vehicle travel history data in the memory.]

[3. The travel history data correction apparatus according to claim 1, wherein:

the vehicle travel history data includes times at which each of the plurality of the links was passed through along the vehicle travel route; and if a particular link having a particular link number indicating that the particular link is not related to adjacent links is detected, replaces the particular link number for the particular link with a link number indicating that the particular link is related to the adjacent links.]

4. A travel history data correction apparatus, comprising:

a memory that stores:

map data comprising connection relationships of links; and vehicle travel history data for a plurality of the links along a vehicle travel route, each of the plurality of the links having a link number; and a controller that:

detects whether there is an adjacency relationship between a first link having a first link number and a second link having a second link number based on the map data, the second link number appearing directly after the first link number in the vehicle travel history data;

detects whether there is an adjacency relationship between the first link and a third link having a third link number based on the map data, the third link number appearing directly after the second link number in the vehicle travel history data; and if there is no adjacency relationship detected between the first link and the second link and there is a an adjacency relationship detected between the first link and the third link, replaces the second link number with at least one of first link number and the third link number.

5. The travel history data correction apparatus according to claim 4, wherein the controller:

detects whether there is a first common link which connects with both of the first link and the second link; and if the first common link is detected, there is no adjacency relationship detected between the first link and the second link, and there is no adjacency relationship detected between the first link and the third link, replaces a link number at a last occurrence of the first link in the vehicle travel history data with a link number corresponding to the first common link.

6. The travel history data correction apparatus according to claim 5, wherein the controller:

detects whether there is a first common link which connects with both of the first link and the second link;

detects whether there is a second common link which connects with both of the first link and the third link; and if there is no adjacency relationship detected between the first link and the second link, there is no adjacency relationship detected between the first link and the third link, there is no first common link, and there is a second common link, replaces the second link number with a link number corresponding to the second common link.

[7. A travel history data correction method, comprising:

storing:

map data comprising connection relationships of links; and vehicle travel history data for a plurality of the links along a vehicle travel route, each of the plurality of the links having a link number;

detecting adjacency relationships among the plurality of links based on the map data; and replacing a link having a link number indicating that there is no adjacency relationship for the link in the vehicle travel history data with another link having another link number indicating that there is an adjacency relationship for the other link.]

8. A travel history data correction method, comprising:

storing:

map data comprising connection relationships of links; and vehicle travel history data for a plurality of the links along a vehicle travel route, each of the plurality of the links having a link number; and detecting whether there is an adjacency relationship between a first link having a first link number and a second link having a second link number based on the map data, the second link number appearing directly after the first link number in the vehicle travel history data;

detecting whether there is an adjacency relationship between the first link and a third link having a third link number based on the map data, the third link number appearing directly after the second link number in the vehicle travel history data; and if there is no adjacency relationship detected between the first link and the second link and there is a an adjacency relationship detected between the first link and the third link, replacing the second link number with at least one of first link number and the third link number.

*9. A travel history data correction apparatus comprising:*

*a memory that stores:*

*map data comprising connection relationships of links; and*

*vehicle travel history data for a plurality of the links along a vehicle travel route, each of the plurality of the links having a link number; and*

*a controller that:*

*detects whether there is an adjacency relationship between a first link having a first link number and a second link having a second link number based on the map data, the second link number appearing directly after the first link number in the vehicle travel history data;*

*detects whether there is a first common link which connects with both of the first link and the second link; and*

*if there is no adjacency relationship detected between the first link and the second link and there is a first common link, replaces the first link number with a link number corresponding to the first common link.*

*10. A travel history data correction method comprising:*

*storing in a memory:*

*map data comprising connection relationships of links; and*

*vehicle travel history data for a plurality of the links along a vehicle travel route, each of the plurality of the links having a link number;*

*detecting whether there is an adjacency relationship between a first link having a first link number and a second link having a second link number based on the map data, the second link number appearing directly after the first link number in the vehicle travel history data;*

*detecting whether there is a first common link which connects with both of the first link and the second link; and*

*replacing the first link number with a link number corresponding to a first common link if there is no adjacency relationship detected between the first link and the second link and there is the first common link.*

* * * * *